United States Patent Office 3,482,995
Patented Dec. 9, 1969

3,482,995
METHOD FOR PRODUCING CANDIED FRUITS
Shiro Hori, Tokyo, and Takeshi Fugono, Osaka, Japan, assignors to Takeda Chemical Industries, Ltd., Osaka, Japan
No Drawing. Filed Aug. 23, 1965, Ser. No. 481,886
Int. Cl. A23l 1/06
U.S. Cl. 99—102                                      8 Claims

ABSTRACT OF THE DISCLOSURE

A process of candying sap fruits by treating the sap fruits as the starting material with an enzymatic composition produced by the microorganism Trametes sanguinea at a stage not later than the starting of the candying step.

This invention relates to a method for producing candied fruits.

The invention was completed on the basis of the finding that the enzymatic composition produced by microorganisms belonging to the genus Trametes is capable of facilitating the candying of fruits, when applied to the fruits in the process of preparing candied fruits. According to this invention, the time required for candying fruits is remarkably shortened.

According to known methods, candied fruits are prepared by the following procedure:

Fruits are gathered before they are fully mature. Fresh fruits are stored in a dilute solution of sulfurous acid or sulfur dioxide and a lime solution for the purposes of bleaching the color and hardening the tissues, and for preserving the fruits until needed. Fruits preserved in the above-mentioned brine are thoroughly leached repeatedly in hot water to remove all taste of sulfur dioxide before starting the candying process. For example cherries are stemmed and carefully pitted before leaching. Apricots are pitted without cutting the fruits in half. Plums, prunes, and other whole fruits are often pricked with copper wires. In the case of preparing candied peaches, fresh fruits and canned fruits are used without the intermediate step of storage in sulfurous acid. The fruit prepared by the above mentioned treatment in sulfurous acid and boiling water to render it tender, or by the boiling of the prepared fresh fruit, is placed in a syrup containing sucrose and/or glucose in a relatively low concentration. Canned fruits are placed in this syrup directly from the can. The syrup immersion is carried out with the gradual increasing of the sugar concentration of the syrup. For example, the fruit is placed in a syrup containing approximately 30% by weight of sucrose and/or glucose. The mixture is allowed to stand at room temperature. After 24 hours or longer immersion, the syrup is drained from the fruit and is made up to approximately 35% by weight by the addition of sucrose and/or glucose. The mixture is again allowed to stand for 24 to 48 hours. The syrup is then increased to 40% by weight in the manner described above, and the fruit is allowed to stand for another 24 hours. The process is repeated on succeeding days, with an increase of 5% by weight each day until the syrup has reached approximately 80%. This concentration is maintained until the fruit and syrup have thoroughly equalized in sugar concentration. The fruit is maintained in this heavy syrup at least 3 weeks until it becomes plump and impregnated with the syrup. In this candying process the sugar concentration of the syrup should be increased slowly, since rapid increase causes the shrinking of the fruits.

As mentioned above, the candying process requires a long period of time in hitherto employed processes for producing candied fruits. A few improvements have been proposed for shortening the period required for the candying, for example, the process wherein fruits are cooked in syrup in the candying process, and the process wherein fruits are blast-frozen and candied under heating at about 66° C. However, these hitherto proposed processes are not considered as industrially profitable ones, owing to the fact that these processes require enormous installations and that candied fruits obtained by these processes are bad in quality.

This invention provides a remarkable improvement for shortening the period of time required for the candying. The object of this invention is realized by treating sap fruits used as starting materials with an enzymatic composition produced by microorganisms belonging to the genus Trametes, at a stage not later than starting the process for candying of fruits in the processes for producing candied fruits.

Hereinafter, an enzymatic composition capable of shortening the period of time required for the candying of fruits, prepared by the incubation of microorganisms belonging to the genus Trametes is simply referred to as "the enzymatic composition." Examples of microorganisms of the genus Trametes which can be used in this invention are as follows:

Trametes purpurea Cooke
Trametes kusanoana Imaz.
Trametes malicola Berk. et Curt.
Trametes cinnabarina (Jacq.) Fr.
Trametes sanguinea (L. ex. Fr.) Lloyd
Trametes suaveolens (L.) Fr.
Trametes albida (Fr.) Bourd. et Galz.
Trametes heteromorpha (Fr.) Lloyd
Trametes dickinsii Berk.
Trametes trogii Berk.
Trametes palisoti (Fr.) Imaz.
Trametes acuta (Bark.) Imaz.
Trametes serpens Fr.
Trametes sendaiensis Yas.
Trametes muelleri Berk.
Trametes hispida Bagl.
Trametes ljubarskyi Pilat
Trametes aneba (Berk.) Imaz.

Microorganisms are sometimes known by two or more of different names but the names of the microorganisms refered to in this specification are based on the system shown in "Mycological Flora of Japan" by Seiya Ito, published by Yokenda, Tokyo, in 1959.

The microorganisms can be incubated in a liquid or solid medium. In general, the use of a liquid medium is preferable for the preparation of the enzymatic composition in an industrial scale. In most cases, it may be preferable to subject microorganisms of the genus Trametes to submerged cultivation. Generally, the microorganisms of the genus Trametes are cultured under stationary or agitational conditions or under aeration.

The culture medium employable should contain carbon and nitrogen sources which are assimilable by the microorganisms of the genus Trametes. Examples of assimilable carbon sources are starch, dextrin, sucrose, lactose, maltose, glucose, blackstrap molasses and glycerol. Examples of assimilable nitrogen sources are such inorganic or organic compounds as ammonium salts, various kinds of nitrates, cornsteep liquor, peptone, polypeptone, meat extract, soybean cake, soybean flour, wheat flour, yeast extract, urea or various amino acids. In addition, mineral salts such as calcium salts, magnesium salts, potassium salts, sodium salts, zinc salts, copper salts or iron salts, vitamins or growth-promoting factors may be added to the culture medium as accessory nutrients.

The conditions of incubation should be controlled so as to make the amount of the enzymatic composition maximum. Such conditions as the pH value of the medium, incubation temperature and incubation period may vary with the kind of microorganisms, components of medium, etc. In most cases, the incubation is desirably carried out at a temperature of 25–32° C. and the accumulated enzymatic composition in the culture broth reaches a maximum usually after several tens of hours to several hundred hours. The preferable pH value of the medium is generally 3.0–6.0.

The accumulated enzymatic composition may be recovered from the culture broth. Generally-known means for recovering enzymes from their solution can be applied to the recovering of the enzymatic composition of this invention. The enzymatic composition can be adsorbed on various adsorbents or precipitated by some precipitants. Moreover, general means for recovery such as precipitation near the isoelectric point, salting out or dialysis, or a combination thereof may be effected for the purpose of recovery and purification. The enzymatic composition is usually contained in the culture filtrate. Accordingly it may be preferable to recover the enzymatic composition from the culture filtrate or to separate it from the culture broth by means of filtration or centrifugation. For example a culture filtrate containing the enzymatic composition can be salted out by the addition of an inorganic salt such as sodium sulphate, ammonium sulphate, or by the addition of an appropriate hydrophilic organic solvent such as methanol, ethanol, normal propanol or acetone. The amount of these salts or hydrophilic organic solvent to be added may vary with the kind of salts or hydrophilic organic solvent. For example, ammonium sulphate may be preferably added to the culture filtrate up to 70% saturation. When employing a hydrophilic organic solvent, 70% saturation may be preferable. If desired, the crude enzymatic composition obtained may be purified for example by repeated salting out with ammonium sulphate. When ammonium sulphate is employed, the fraction of the enzymatic composition may, in general, be obtained at 10–50% saturation.

The enzymatic composition is composed of many kinds of enzymes, e.g. cellulase, CMC-ase, hemicellulase, protease, peptidase, glucanase, RNA-depolymerase, sucrase, maltase, lactase, xylanase, inulase, dextranase, mannase, $\alpha$-amylase, $\beta$-amylase, lipase, pectinase and cellobiase.

The said enzymatic composition may preferably be employed after being purified to make at least its protease activity more than 100,000 units per gram, when assayed according to the method described in "Journal of General Physiology," volume 22, p. 79 (1938), except the reaction temperature and pH are 45° C. and 2.5 respectively. It is noteworthy that the effect of shortening the time for the candying is not found at all when pure protease is employed, and that the effect is exhibited by employing the enzymatic composition composed of above-mentioned enzymes.

In this invention, materials containing the enzymatic composition, e.g. culture broths, culture filtrates, cell bodies or mycelia, may be employed as such without subjecting the material to any further treatment when the protease activity is sufficiently high.

In the method of this invention, the time for the candying is shortened by increasing the rate of the impregnation of the fruits with sugar without causing the shrinking of the fruits by treating sap fruits as the starting material with the enzymatic composition at a stage not later than the candying stage in the processes for producing candied fruits. The effect of shortening the period of the candying process by the method of this invention is found in all cases of employing sap fruits usable as starting material for producing candied fruits. However, the effect of this invention is especially remarkable in cases of employing stonefruits such as cherry, apricot, plum, prune, jujube and peach, and among the stonefruits, relatively small stonefruits such as cherries, plums and apricots are more suitable as the starting material in the process of this invention. In the case of employing cherries as the starting material in the process of this invention, the period of time required in order to impregnate the cherries with sugar to make the sugar concentration of cherries approximately 72% by weight is shortened to about 4 or 5 days without causing the shrinking of the cherries, as described in Example 1. In contrast thereto, at least 3 weeks are required for the same purpose according to the conventional process which does not include the treatment by the enzymatic composition.

In the process of this invention, the enzymatic treatment which comprises bringing sap fruits as starting material into contact with the enzymatic composition should be adopted not later than the starting of the candying process. Practically, the enzymatic treatment may be carried out at the suitable stage in the process of preparing fruits before candying or at the early stage of the candying. Since the enzymatic composition brings about not only shortening of the period for candying but bleaching of fruits in cases of preparing candied fruits, such as the Maraschino type of cherries, which require bleaching process before the candying, both effects of shortening the period of candying and of bleaching fruits are brought about by the above-mentioned enzymatic treatment. Practically, the enzymatic treatment may be carried out by immersing sap fruits in an aqueous solution containing the enzymatic composition. The aqueous solution employed in the enzymatic treatment, may preferably contain about between 0.01% and 1.00% by weight of the enzymatic composition so far as the enzymatic composition which has protease activity of more than 100,000 units per gram is employed as mentioned above. The enzymatic treatment is preferably carried out at a temperature between 20° C. and 45° C. and at pH value between 2.0 and 6.0 under stationary conditions. The period for the enzymatic treatment varies with the kinds of sap fruits used as starting material, the amount of sap fruits, the concentration of the enzymatic composition employed, etc. In general, 1 to 3 days are sufficient for the completion of impregnation of the fruit with the enzymatic composition.

When the enzymatic treatment is carried out simultaneously with the candying procedure, sap fruits are immersed in sugar syrup to which is added the enzymatic composition, at an early stage of the candying.

Sap fruits impregnated with the enzymatic composition may be impregnated also with sugar in a shorter period of time so that the sugar concentration in the syrup may be increased rapidly in the candying process of this invention. Accordingly it is possible to shorten the period of the candying to about between one-third and one-sixth of that in hitherto employed processes, without causing shrinking of sap fruits.

The following examples are shown only for illustrative purposes and are not intended to limit the scope of this invention. In the examples, percent means weight percent unless otherwise noted. The strains of *Trametes sanguinea* (L. ex Fr.) Lloyd employed in these examples are deposited at the American Type Culture Collection (ATCC), Washington, D.C., U.S.A. and bear the accesion number abbreviated as ATCC–14622.

EXAMPLE 1

10 kilograms of cherries are preserved in 10 liters of the brine containing 3% of sodium hydrogensulfite and 0.1% of calcium chloride, adjusting the concentration of sulfur dioxide in the brine to above 0.7% by the addition of sodium hydrogensulfite. After about three months storage, the cherries are pitted and stemmed, and then immersed in about 10 liters of 1% calcium chloride solution to harden the tissues of the cherries. The cherries are heated to boiling with incessant changing of water to reduce the sulfur dioxide below 500 p.p.m.

On the other hand, *Trametes sanguinea* (L. ex Fr.) Lloyd (ATCC–14622) is inoculated on a sterilized aqueous medium of pH 6.0 containing 4% of sucrose, 2% of glucose, 3% of soybean cake, 1% of cornsteep liquor, 0.2% of ammonium sulfate, 0.2% of potassium dihydrogenphosphate, 0.1% of magnesium sulfate (as 7 hydrate) and 0.05% of copper sulfate. The medium is agitated at 160 revolutions per minute under aeration of 500 liters per minute. The incubation is carried out for 140 hours at 28° C. After adjusting the pH to 4.0 with ammonium sulfate, the culture broth is filtered. Then, 200 kilograms of ammonium sulfate are added to the 400 liters of filtrate obtained to yield precipitates. The precipitates are collected by centrifugation, and dried at 35° C. to give 4 kilograms of the crude enzymatic powder. 150 grams of the crude enzymatic powder is dissolved in 1500 milliliters of distilled water and dialyzed at 4° C. for 1 day. The dialyzed solution is concentrated to 220 milliliters and salted out with ammonium sulfate at 10%–50% saturation to obtain enzymatic composition having protease activity of 187,700 units per gram when assayed according to the method described in "Journal of General Physiology," Volume 22, p. 79 (1938), except the reaction temperature and pH are 45° C. and 2.5 respectively. 10 grams of thus obtained enzymatic composition is dissolved in 10 liters of water, and then the solution is adjusted to a pH of 3.0 by the addition of citric acid.

Cherries are immersed in thus-prepared enzymatic solution for 24 hours at 45° C. After the enzymatic treatment, the cherries are added to 10 liters of water. 250 milliliters of dye solution containing 3.5 grams of Erythrosin and 1.5 grams of Ponceau R (both are commercially available red dyes of Hodogaya Kagaku Kabushiki Kaisha, Japan) is added to the mixture, while keeping the temperature at 80° C. The mixture is kept standing for 15 minutes, and then 100 milliliters of 1% tartaric acid solution is added to the mixture. The mixture is further heated at 80° C. for 40 minutes, whereby cherries are dyed and the enzymes in the cherries are inactivated. The cherries are immersed in 10 liters of 40% sucrose syrup. The mixture is allowed to stand at room temperature for 24 hours, then the whole portion of syrup is drained from the immersion tank and the syrup is made up to 60% by the addition of sucrose. The cherries are again immersed in the 60% sucrose syrup and then the mixture is allowed to stand at room temperature. After 24 hours immersion, the syrup is drained from the immersion tank and made up to 70% by the addition of sucrose. After 24 hours immersion in 70% syrup, the syrup is increased to 80% in the manner described above. After 24 hours immersion, the syrup is readjusted to 80% by the addition of sucrose, and then the immersion is further continued for 24 hours.

By the above-mentioned candying for 5 days, the concentration of sucrose in the cherries reached approximately 72% without shrinking the cherries. The cherries are removed from the syrup and dried by a conventional method.

In comparative tests wherein the candying is carried out without previously performing the above-mentioned enzymatic treatment, 21 days are required in order to have cherries impregnated with sucrose until sucrose concentration of cherries reaches approximately 72% without causing the shrinking of the cherries.

EXAMPLE 2

10 kilograms of fresh cherries are immersed in 10 liters of an aqueous solution of pH 4.0 containing 0.2% of the same enzymatic composition as employed in Example 1, at 25° C. for 2 days to bleach cherries. The cherries are pitted and stemmed, and then immersed in 10 liters of 1% calcium chloride solution to harden the tissues of the cherries. After being dyed in the same way as in Example 1, the cherries are candied for 5 days in the same way as in Example 1, whereby the concentration of sucrose in them reached approximately 70% without causing the shrinking of cherries. Then the cherries are removed from the syrup and dried by a conventional method.

EXAMPLE 3

10 kilograms of plums are preserved in 10 liters of the same brine as in Example 1 for 3 months. After being removed from the brine, the plums are pricked with copper wires, and then immersed in 10 liters of an aqueous solution of pH 4.5 containing 0.1% of the same enzymatic composition as employed in Example 1 at 45° C. for 2 days. Plums thus treated are added to 10 liters of water, followed by heating at 80° C. for 2 hours to inactivate the enzymes remaining in the plums. The plums are candied for 5 days in the same way as in Example 1, whereby the concentration of sucrose in them has reached approximately 70% without causing shrinkage. The plums are removed from the syrup and dried by a conventional method.

In comparative tests, wherein the candying is carried out without previously performing the above-mentioned enzymatic treatment, 22 days are required in order to have plums impregnated with sucrose until the concentration of sucrose in plums reaches approximately 70% without causing the shrinkage of the plums.

EXAMPLE 4

10 kilograms of apricots are preserved in 10 liters of the same brine as in Example 1 for 3 months. After being removed from the brine, the apricots are pitted. The apricots are immersed in 10 liters of an aqueous solution of pH 3.0 containing 0.2% of the same enzymatic composition as employed in Example 1, at 40° C. for 2 days, and then the apricots are added to 10 liters of water, followed by the heating at 80° C. for 2 hours to inactivate the enzymes in the apricots. The apricots are candied for 6 days in the same way as in Example 1, whereby the concentration of sucrose in the apricots reached approximately 70% without causing shrinking. The apricots thus treated are removed from the syrup and dried by a conventional method.

In comparative tests, wherein the candying is carried out without previously performing the above-mentioned enzymatic treatment, 23 days are required in order to have apricots impregnated with sucrose until the concentration of sucrose in apricots reaches approximately 70% without causing shrinking.

What is claimed is:

1. In a process for producing candied fruits by candying sap fruits, the improvement according to which sap fruits as starting materials are treated with the enzymatic composition produced by *Trametes sanguinea*, at a stage not later than the starting of the candying step.

2. In a process for producing candied fruits by candying sap fruits, the improvement according to which sap fruits as starting material are immersed in an aqueous solution containing about between 0.01 and 1% by weight of the enzymatic composition produced by *Trametes sanguinea* (L. ex Fr.) Lloyd, at a pH value of about between 2.0 and 6.0 and at a temperature of about between 15° C. and 50° C., at a stage not later than the starting of candying.

3. The improvement as claimed in claim 2, wherein the sap fruit is a stonefruit.

4. The improvement as claimed in claim 2, wherein the sap fruit is cherry.

5. The improvement as claimed in claim 2, wherein the sap fruit is apricot.

6. The improvement as claimed in claim 2, wherein the sap fruit is plum.

7. The improvement as claimed in claim 2, wherein the sap fruit is prune.

8. The improvement as claimed in claim 2, wherein the sap fruit is jujube.

References Cited

UNITED STATES PATENTS 3,307,954   3/1967   Blakemore _____ 99—156 XR

OTHER REFERENCES

Tomoda et al.: Acid Protease Produced by *Trametes sanguinea*, a wood-destroying fungus, Agricultural and Biological Chemistry, vol. 28, No. 11, 1964 (p. 770–778).

A. LOUIS MONACELL, Primary Examiner

J. M. HUNTER, Assistant Examiner